United States Patent

Bom et al.

Patent Number: 6,116,526
Date of Patent: Sep. 12, 2000

[54] IMPLEMENT FOR SPREADING GRANULAR AND/OR PULVERULENT MATERIAL

[75] Inventors: Cornelis Johannes Gerardus Bom, Rozenburg; Hendrik Hans van der Vlugt, Maasland; Pieter Jacob van der Waal, Maassluis, all of Netherlands

[73] Assignee: Maasland N,V., Netherlands

[21] Appl. No.: 08/503,239

[22] Filed: Jul. 17, 1995

[30] Foreign Application Priority Data

Mar. 24, 1995 [NL] Netherlands .......................... 9500565
Jul. 22, 1997 [NL] Netherlands .......................... 9401205

[51] Int. Cl.$^7$ .................................................. A01C 17/00
[52] U.S. Cl. .......................... 239/682; 239/683; 239/657
[58] Field of Search ................................. 239/681–685, 239/687

[56] References Cited

U.S. PATENT DOCUMENTS

| | | |
|---|---|---|
| 2,907,498 | 10/1959 | van der Lely et al. . |
| 3,038,643 | 6/1962 | van der Lely et al. . |
| 3,120,379 | 2/1964 | van der Lely et al. . |
| 3,273,898 | 9/1966 | van der Lely et al. . |
| 3,586,246 | 6/1971 | van der Lely et al. . |
| 3,615,055 | 10/1971 | van der Lely et al. . |
| 3,767,126 | 10/1973 | van der Lely et al. . |
| 4,008,854 | 2/1977 | van der Lely et al. . |
| 4,183,468 | 1/1980 | van der Lely et al. . |
| 4,497,446 | 2/1985 | van der Lely et al. . |
| 4,609,153 | 9/1986 | van der Lely . |
| 4,763,844 | 8/1988 | van der Lely et al. . |
| 4,834,296 | 5/1989 | van der Lely et al. . |
| 4,842,202 | 6/1989 | van der Lely et al. . |
| 5,004,163 | 4/1991 | van der Lely et al. . |
| 5,046,664 | 9/1991 | van der Lely et al. . |

FOREIGN PATENT DOCUMENTS

| | | |
|---|---|---|
| 0 273 488 A1 | 7/1988 | European Pat. Off. . |
| 0 303 325 A2 | 2/1989 | European Pat. Off. . |
| 0 545 894 A2 | 6/1993 | European Pat. Off. . |
| 1 493 525 | 11/1977 | United Kingdom . |
| 2 158 336 | 11/1985 | United Kingdom . |

*Primary Examiner*—Lesley D. Morris
*Attorney, Agent, or Firm*—Penrose Lucas Albright

[57] ABSTRACT

An implement for spreading granular material, such as fertilizer, wherein the flow of fertilizer from the hopper is controlled by the position of a metering slide under an outlet opening of the hopper. The metering slide has an indented asymmetric edge which cooperates with the outlet opening to control of the flow of fertilizer onto an underlying spreader. The metering slide is moved into its position under the outlet opening by the pivotal movement of a sector-shaped support in hinged connection with the metering slide. The metering slide is urged against the hopper and the sector shaped support by a spring. The flow of material from a plurality of outlet openings is selectively controlled either individually or in unison. Also, the implement can be tilted.

55 Claims, 5 Drawing Sheets

6,116,526

IMPLEMENT FOR SPREADING GRANULAR AND/OR PULVERULENT MATERIAL

FOREIGN APPLICATION PRIORITY DATA

The priority dates of The Netherlands Application Numbers 9401205 and 9500565, filed Jul. 22, 1994 and Mar. 24, 1995, respectively, are claimed.

FIELD OF INVENTION

The present invention relates of an implement for spreading granular and/or pulverulent material, especially for spreading fertilizers. More particularly, the implement comprises both a hopper provided with at least one outlet opening and at least one spreading member, wherein the outlet opening is capable of being further selectively closed or opened by a metering slide which is capable of moving forward and backward along a hopper wall comprising the outlet opening and of being selectively put into one of at least two positions.

BACKGROUND OF THE INVENTION

Many devices for controlling the spread and the amount of fertilizer or other granular material have been disclosed.

For example, U.S. Pat. No. 2,907,498 which issued Oct. 6, 1959 by Cornelis van der Lely et al discloses a horizontal plate 27 which forms a bottom of the hopper vertical slide 23 which slides along the wall of the hopper. Both plate 27 and slide 23 may be opened or closed by movement imparted by the rotation of axis 32.

A further example is U.S. Pat. No. 3,586,246, also by Cornelis van der Lely et al and issued Jun. 23, 1971. This document relates to a spreading implement with one or more flow control members which are positioned below the container and are movable in a register with the outlet via an adjusting or setting mechanism.

Another spreading implement by Cornelis van der Lely et al may be found in U.S. Pat. No. 3,615,055 which issued Oct. 26, 1971. This U.S. patent document also discloses a hopper with an outlet opening and a flow control member movable relative thereof.

U.S. Pat. No. 4,008,854 of Ary van der Lely et al issued on Feb. 22, 1977, describes a hopper with two outlet ports on the bottom thereof and flow control devices, which have holes, positioned beneath each port.

Described in U.S. Pat. No. 4,183,468, also by Ary van der Lely et al, uncovers the plurality of ports of its spreader via hydraulic control.

U.S. Pat. No. 4,609,153 by Cornelis van der Lely issued Sep. 2, 1986. This U.S. patent describes a spreader with dosing plates in the hopper's bottom having openings which cooperate with one another in an adjustable manner.

Ary van der Lely et al also describe, in U.S. Pat. No. 4,834,296, which issued May 30, 1989, a spreader wherein the size of the aperture of each port is adjustable by a dosing slide.

SUMMARY OF THE INVENTION

The invention has an objective to provide a metering slide which is capable of being easily moved along the outlet opening for selectively closing or opening to any extent practical. According to the invention, this is achieved by that the metering slide is forced against the wall and extends to beyond the wall and beyond the wall, is forced against the curved side of a sector-shaped support, and is capable of rolling on this curved side as it moves along the outlet opening during adjustment. A sound and convenient construction is obtained, so that the operation of the metering slide is smooth and exact. An advantageous embodiment of the invention is obtained when the metering slide is connected to the sector-shaped support by means of a connecting member, wherein the sector-shaped support is mounted on an adjusting shaft and is capable of pivoting so as to move the metering slide.

According to a further exemplary embodiment of the invention, the adjusting shaft is coupled to an adjusting mechanism, by means of which the discharge of the desired amount of material per unit of time from the hopper to the spreading device is controllable by selectively setting the size of passage of the outlet opening through opening or closing this outlet opening to a larger or smaller extent by means of the metering slide.

In a further embodiment of the invention, the sector-shaped support is U-shaped, the legs of the U being two sector-shaped supporting plates whose curve sides each abut against the metering slide. An appropriate support for the metering slide is obtained in this manner, where a correct position of the metering slide relative to the outlet opening is easily maintained. According to the invention, the guiding of the metering slide can further be influenced advantageously when the metering slide is provided with a protrusion which constitutes a guide member located in a groove formed between the wall and a supporting part provided thereon.

According to a further exemplary embodiment of the invention, the implement comprises at least two spreading members, each corresponding with an outlet nozzle of the hopper comprising at least one outlet opening, where the metering slides, each of which operates in conjunction with the outlet openings in the respective outlet nozzles, abut against the respective walls and against the curved side of a sector-shaped support, where the sector-shaped supports of the two metering slides are coupled to the same adjusting shaft and are simultaneously adjustable by this adjusting shaft. In this manner, it is feasible to keep the operation of the metering slides simple. With this, the volume control to the two spreading members through the two nozzles can be effected in an advantageous manner. An advantageous embodiment of the invention is achieved when the two spreading members and the corresponding outlet openings are shaped and arranged, and the spreading members are made to rotate so that the two spreading members each broadcast material over the same strip when the implement during operation travels over the surface area to be covered.

The adjustment of the supply from the hopper to the spreading member can advantageously be influenced when, according to a further embodiment of the invention, the side of the metering slide which operates in conjunction with the outlet opening for the purpose of closing or opening the latter by certain amount is provided with recesses or indentations which form, at least after partial closure of the outlet opening, in combination with parts of the sides of the outlet opening, two or more small passages situated side by side. In this manner, it is feasible to supply small quantities of material per unit of time to the spreading members such that the relatively small quantities of material are evenly distributed over the desired width in an advantageous manner. A preferred embodiment of the invention is obtained when the indentations, as viewed at right angles to the metering slide, are V-shaped, where the two divergent sides of the V-shaped facing the closing side of the outlet opening are disposed such that, when the outlet is being closed, the deepest portion of each indentation moves past the closing side of the outlet opening. According to a preferred embodiment of the invention, the metering slide comprises three indentations, the central one of which has a smaller width than the two adjoining indentations which have an approximately equal width.

A suitable reception by the spreading member of material flowing from the hopper can be advantageously influenced when the spreading member comprises at least one spreading blade whose inner end part, which faces the axis of the spreading member and during operation passes by an outlet opening, is lower than the outer part of the spreading blade turned away from the rotary axis. Here, the lower part of the spreading blade is capable of receiving the material in an advantageous manner, whereas the outer part of the spreading blade is capable of feeding the material towards the perimeter of the spreading member in an advantageous manner so as to spread or broadcast the material as favorably as feasible.

The supply of material from the hopper to the spreading member can be channelled advantageously when, in between the wall part in which the outlet opening is provided and the spreading member, there is disposed a guard flange which extends at least approximately around a part of the outlet opening, as viewed from above. Moreover, it can be advantageous that the guard flange has its top side at least approximately connected to that side of the outlet opening which is averted from the rotary axis of the spreading member or the center of the outlet nozzle. Herewith, at a suitable distance from the rotary axis, the material can be delivered to the spreading member in an advantageous manner. The construction with the guard flange is further capable of being advantageously influenced when, in downward direction, the guard flange diverges from the rotary axis of the spreading member and has its lower edge situated at a short distance above the top side of the lowered inner part of a spreading blade. In this way, it is possible to distribute the material suitably over the spreading member and the spreading blades attached to it.

According to the invention, the supply of material through the outlet openings to the spreading member can be kept constant in an advantageous manner when, near the outlet opening in the outlet nozzle, there is provided a stirring member which is rotatably mounted on an axle connected eccentrically to the shaft of the spreading member, where the stirring member comprises stirring means extending essentially vertically in the outlet nozzle of the hopper. The stirring means are capable of keeping the material loose in an advantageous manner, without adversely affecting the material as regards its granular structure. A preferred embodiment of the invention is obtained when the stirring means are triangular in shape and, by means of carrying arms, are connected to a carrying member rotatably mounted on the axle.

The spreading of material by the spreading member can be advantageously influenced when, around at least a part of the spreading member, there is provided a guide flange and on the top side of this flange there is situated a guard plate extending at least over a portion of the top surface of the spreading member. In maintaining a good distribution by the spreading member an advantageous effect is further obtained when a flexible guide flange directed downwards is placed on the adjusting shaft for the sector-shaped supports, where this flexible guide flange extends from the adjusting shaft to beyond the front of the guide plates and/or the sector-shaped supports. Influences from flows of air round the spreading member, which might adversely affect the appropriate distribution, are thus obviated. Accordingly, the material being distributed by the spreading members cannot leave the implement in any undesired manner.

BRIEF DESCRIPTION OF THE DRAWINGS

The invention will now be further explained with reference to the accompanying drawings of embodiments of the implement according to the invention, in which drawings:

FIG. 4 is a detail view of a part of FIG. 2;

DETAILED DESCRIPTION OF THE PREFERRED EMBODIMENTS

Figure 1:
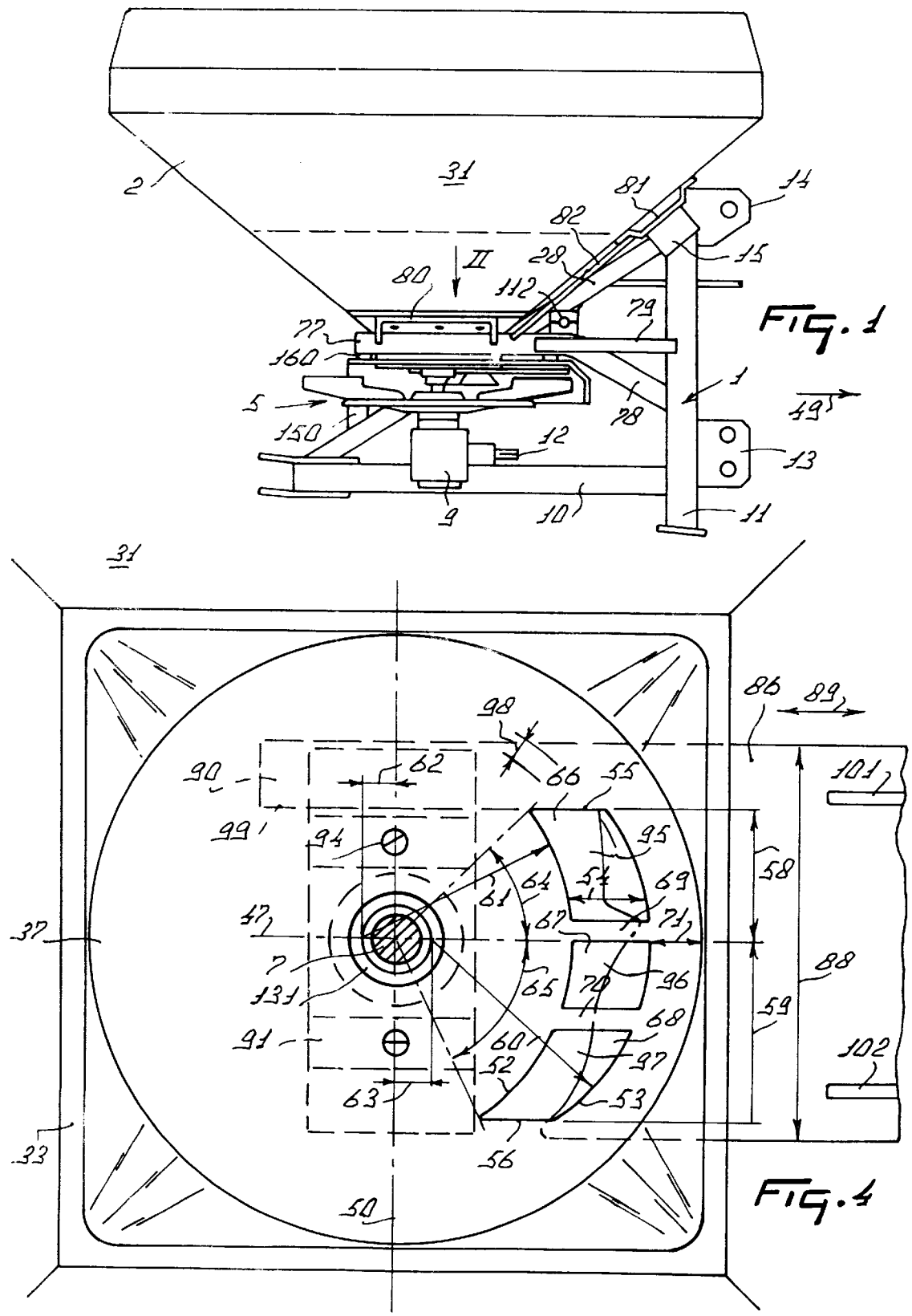
FIG. 1 shows an elevational view of an embodiment of the invention.

The implement shown in the drawings is an implement which, for spreading granular and/or pulverulent material over a surface area, is propelled over this area. The invention particularly relates to a fertilizer spreader for broadcasting fertilizer over agricultural lands.

In the Figures, arrow 49 points in the direction considered herein as forward and the normal direction of travel for the invention.

Figure 2:
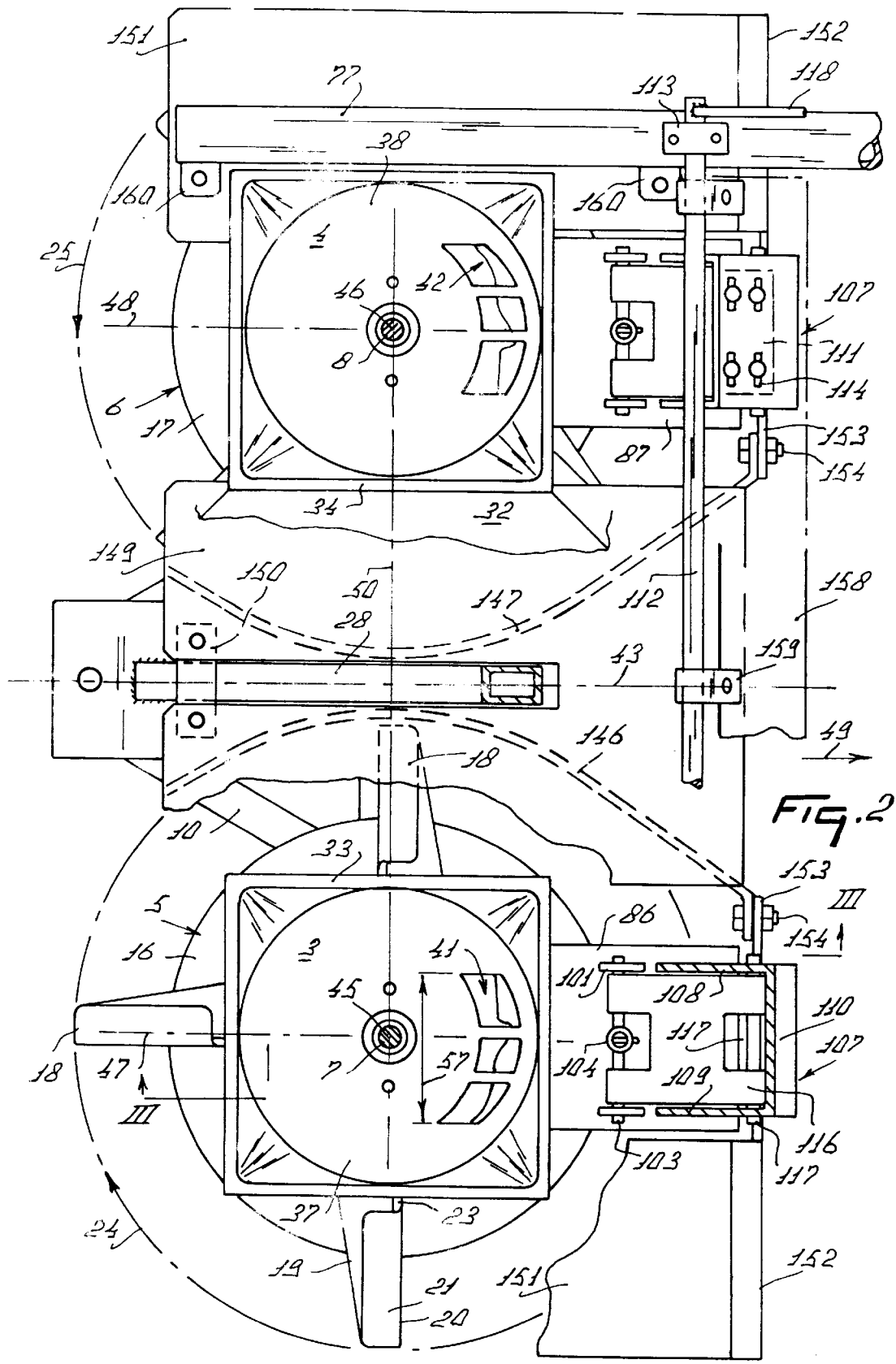
FIG. 2 is a sectional plan view of a part of the implement taken in the direction of arrow II of FIG. 1.

The implement comprises, referring to FIGS. 1 and 2, frame 1, on which hopper 2 is mounted. Hopper 2 comprises two nozzles 3 and 4. Spreading member 5 and spreading member 6 are disposed under their respective nozzles. Spreading members 5 and 6 are mounted on shafts 7 and 8, respectively. Shafts 7 and 8 are bearing-supported in gearboxes 9, of which only one is shown in the drawings. Gearboxes 9 are mounted on two supporting beams 10. Supporting beams 10 are disposed and cooperate to form a V, when viewed from above, having their front ends attached to vertical main frame from beams 11 of frame 1, which are disposed outboard of and near the outboard forward corners of outlet nozzles 3 and 4, their aft ends converging to connect under the after aspects nozzles 3 and 4, at the rear of the implement. Gearboxes 9 comprise conical gear transmissions operatively connected with respective shafts 7 and 8. The gear transmissions provided in gearboxes 9 are operatively connected with each other by means of a connecting shaft (not shown) provided between two gearboxes 9. This connecting shaft is operatively connected to drive shaft 12. During operation of the implement, drive shaft 12 can be connected with the power take-off shaft of a tractor or similar vehicle, to which the invention is coupled during operation. For this coupling to the tractor or other similar vehicle, frame 1 is provided with two coupling members 13 which are connectable with the bottom links of the power lift of the tractor and coupling member 14 connectable with the top link of the power lift of the tractor. Coupling member 14 is attached to cross beam 15 which interconnects the upper ends of main frame beams 11. As is apparent from FIG. 1, the front side of hopper 2 is attached to cross beam 15. In this embodiment of the invention, two spreading members 5 and 6 each comprise broadcasting plates 16 and 17, respectively, each of which is circular and equipped with spreading blades 18. In this embodiment, each spreading member 5 and 6 comprise four spreading blades 18 in a uniform angular arrangement around their respective shafts 7 and 8 of spreading members 5 and 6. Spreading blades 18 (also called broadcasting or throwing blades) extend essentially radially with respect to relevant broadcasting plate shafts 7 and 8.

Figure 3:
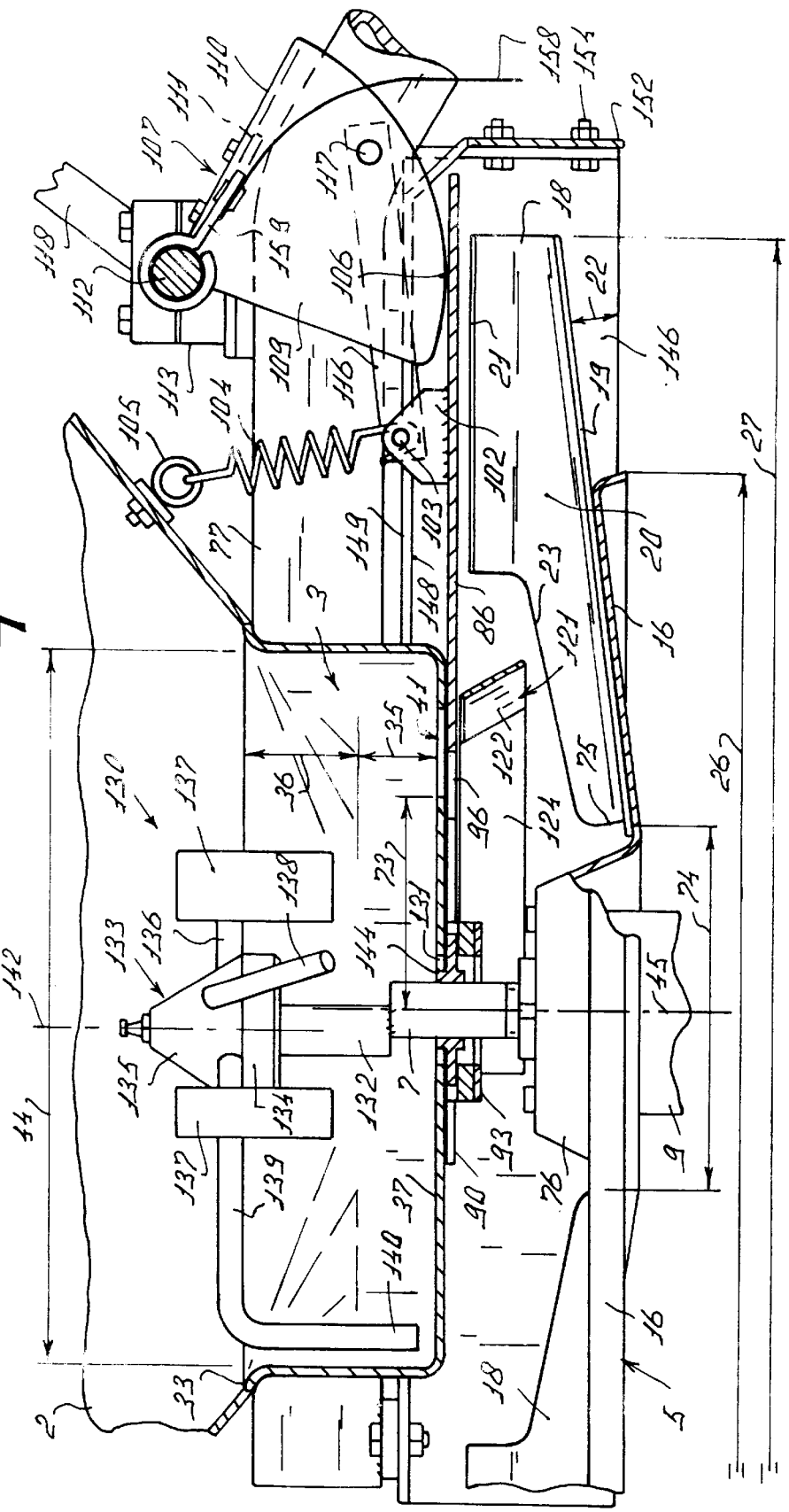
FIG. 3 is a sectional elevational view of a part of the implement taken on the line III—III of FIG. 2.

Spreading blades 18 extend beyond the circumferences of respective broadcasting plates 16 and 17 as shown in FIG. 3 with regard to spreading member 5. Spreading blades 18 of each spreading member 5 and 6 are mutually identical and each comprises lower flange 19. Lower flanges 19 are parallel to, and are mounted to the top surface of their respective broadcasting plate 16 and 17 which is preferably shaped like an inverted cone-shaped upwardly and outwardly at small angle 22 of approximately 5°. As shown in FIG. 2, each lower flange 19 tapers off, from a relatively wide part which is relatively close to the center of its respective spreading member 5 and 6, to the end of the blade. The top sides of spreading blades 18 each comprise upper flange 21 extending perpendicularly to relevant rotary axis 45 and 46. Upper flange 21 has a constant width over its full length (FIG. 2), this width being equal to that of the outer end of lower flange 19. Lower flange 19 and upper flange 21 of each spreading blade 18 face forwardly in relation to the directions of rotation 24 and 25 of the corresponding spreading members 5 and 6. Each spreading blade 18 has upright wall 20 which is vertical in the present embodiment, but which can also be slightly curved. Upper flange 21 extends over approximately one-half the length of spreading blade 18. The upper flange 21 runs from a position within the perimeter of respective broadcasting plates 16 and 17 to the spreading blade's end situated out of this perimeter. Starting from the inner end of upper flange 21 toward relevant axis 45 or 46, wall 20 is reduced in height. From the place of the inner end of upper flange 21, the height of inner blade 18 is reduced by approximately 50%. At this part of blade 18, a lowered top side 23 of wall 20 is essentially parallel to the top side of its respective broadcasting plate 16 or 17. Accordingly, top side 23 runs obliquely downwardly in the direction of its respective shaft 7 or 8 of corresponding spreading member 5 or 6. Each broadcasting plate 16 and 17 of each of spreading members 5 and 6 has a diameter 26. The ends of spreading blades 18 are on circle of diameter 27 concentric with respective shafts 7 and 8 of the corresponding spreading members 5 and 6. Diameter 27 is approximately 1.25 times diameter 26.

Spreading members 5 and 6 are carried by the supporting bracket part made up by supporting beams 10. On the rear side of supporting beams 10, the supporting bracket part is connected with cross beams 15 by means of stay 28.

Hopper 2 comprises two, and in relation to the direction of travel 40, transversely separated, funnel-shaped parts 31 and 32, whose lower ends are connected with respective top edges 33 and 34 of outlet nozzles 3 and 4. Outlet nozzles 3 and 4 are mutually identical and, hence, only outlet nozzle 3 is shown in detail, particularly with reference to FIGS. 3 and 4. Outlet nozzles 3 and 4 are cylindrical at lower part 35, and, from cylindrical part 35 upwards, upper part 36 is a transition from a circular to a rectangular shape such that respective top edges 33 and 34 of the corresponding outlet nozzles 3 and 4 fit the rectangular bottom ends of respective funnel-shaped parts 31 and 32 (which converge in a downward direction, which are rectangular as viewed in horizontal cross-section, and which are in the shape of an inverted pyramid).

Each of outlet nozzles 3 and 4 has respective bottom 37 or 38 which is horizontal when the invention is on a horizontal plane. Bottoms 37 and 38 constitute wall parts of the walls enclosing the hopper volume. Outlet nozzles 3 and 4 each have outlet openings 41 and 42 respectively, with these outlet openings being mutually equal and being disposed such that they are each other's mirror image in relation to center vertical plane 43 of the implement. Respective outlet openings 41 and 42 have three separate passage parts each. Bottom ends (also called lower parts) 35 of outlet nozzles 3 and 4 have inner diameter 44 (seen at the top of FIG. 3) which is approximately 280 mm in the present exemplary embodiment, but which may also be somewhat larger or smaller. Respective center lines 45 and 46 of cylindrical bottom end 35 of the corresponding outlet nozzles each coincides with that of their respective funnel-shaped part 31 or 32 of the hopper. Center lines 45 and 46 also coincide with the corresponding centers lines of their respective spreading members 5 and 6 or their shafts 7 and 8, respectively. Rotary axes 45 and 46 (also called center lines) lie equal distances from center vertical plane 43 in vertical planes 47 and 48 which include the respective rotary axes of the corresponding spreading members 5 and 6.

In relation to normal direction of travel 49 of the implement, outlet openings 41 and 42 in each of respective outlet nozzles 3 and 4 are situated in front of transverse vertical plane 50 which includes center lines 45 and 46 of respective bottom parts 37 and 38 of the corresponding outlet nozzles 3 and 4. Bottom parts 37 and 38 of two outlet nozzles 3 and 4 extend perpendicularly relative to respective center lines 45 and 46, or the axes of rotation of spreading members 5 and 6. Outlet openings 41 and 42 are mutually identical, and therefore only outlet opening 41 is shown in greater detail in FIGS. 3 and 4. Outlet openings 41 and 42 are curved around respective center lines 45 and 46 of the corresponding bottom parts 37 and 38. Referring to FIG. 4, the outlet opening 41 has curved inner side 52 and curved outer side 53. Sides 52 and 53 are separated by a distance 54 which is constant over the length of outlet openings 41 enclosed by two short, mutually opposite sides 55 and 56. Short sides 55 and 56 are parallel as well as parallel to longitudinal vertical plane 47 where it coincides with bottom 37. Outlet opening 41 has width 57 (shown in FIG. 2), as measured between short sides 55 and 56, which is approximately equal to one-half the diameter of bottom 37. Referring again to FIG. 4, on both sides of longitudinal vertical plane 47, opening 41 extends over distances 58 and 59. Distance 59 is slightly greater than distance 58. Distance 59 is on that side of vertical plane 47 which is different from the side facing center vertical plane 43. Sides 52 and 53 of opening 41 each are curved around a point which is in longitudinal vertical plane 47 and on the upper side of bottom 37. Radius 61 of inner side 52 equals radius 60 of outer side 53, where the center of these radii are situated at distances 63 and 62, respectively, on opposite sides of center line 45. An imaginary curve situated centrally between curved sides 52 and 53 and being parallel to sides 52 and 53 has its center on or near center line 45. Distance 63 is behind, and distance 62 is forward of center line 45, as considered in relation to normal direction of travel 49 of the implement during operation. On both sides of vertical plane 47, outlet opening 41 extends over angles 64 and 65 around center line 45, where angle 64 is slightly smaller than angle 65. Outer side 53 of outlet opening 41 is at distance 71 from the inner side of the circumference of cylindrical part 35 of outlet nozzle 3. Distance 71 is virtually equal to, or in the present embodiment, only slightly shorter than distance 54 between curved sides 52 and 53 of outlet opening 41.

In this exemplary embodiment of the invention, each outlet openings 41 and 42 consists of three, mutually separate parts forming passages 66, 67 and 68. These relatively small passages are separated by two bottom strips 69 and 70, which extend between opposite curved edges (or sides) 52 and 53. Passage parts 66 and 68 are virtually identical. Passage part 67 is considerably smaller than parts 66 and 68. Passage part 67 extends over a part of arcs (or edges) 52 and 53 which is approximately one-half as large as either the approximately mutually equal parts of arc 52 and 53 over which respective outlet openings 66 and 68 extend. Passage part 66 is entirely on one side of vertical plane 47, whereas parts 67 and 68 are virtually completely on the other side of this vertical plane. Passage part 66 is situated on that side of vertical plane 47 which faces vertical plane 43.

Corresponding parts of outlet opening 42 in outlet nozzle 4 are indicated by the same reference numbers as used with outlet opening 41, because of the fact that these openings are identical and are symmetrically situated in relation to center vertical plane 43 of the invention.

Viewed vertically and relative to rotary axes 45 and 46 of respective spreading members 56 or center lines 45 and 46 of respective outlet nozzles 3 and 4 (FIG. 3) outlet openings 41 and 42 are situated above respective disc-shaped parts or broadcasting plates 16 and 17 of the corresponding spreading members 5 and 6.

Diameter 44 (seen near the top of FIG. 3) of nozzles 3 is smaller than diameter 26 of respective discs 16 and 17. Referring to FIG. 3, curved side 52 is at distance 73 from rotary axis 45 of spreading member 5 located under relevant opening 41 which distance is greater than one-half of diameter 74 (seen near the bottom of FIG. 3) at which inner ends 75 of spreading blades 18 are concentrically disposed around axis or center line 45. As seen in FIG. 3, viewed vertically and relative to axis 45, outlet opening 41 is above the lower, inner parts of spreading blades 18. Spreading blade ends 75 connect, through a short distance, to a raised, in this exemplary embodiment, a conical, central part 76 attached to shaft 7. Central part 76 is within distance 73.

Referring to FIGS. 1–3, near bottom parts 37 and 38 of respective outlet nozzles 3 and 4, hopper 2 is supported by hopper supports 77. With the machine being in a horizontal position, supports 77 are horizontally oriented and they extend perpendicularly to main frame beams 11. Hopper supports 77 are on mutually opposite sides of outlet nozzles 3 and 4 and, as viewed in direction of travel 49, they are behind main frame beams 11. Hopper supports 77 are connected with main frame beams by means of bent parts 78 directed downwardly, as the arrangement is shown in FIG. 1. The attachment of hopper supports 77 to respective main frame beams 11 is stiffened by supporting rods 79. The connection between hopper 2 and hopper supports 77 comprises brackets 80 which are fastened to the hopper wall and hopper supports 77. Moreover, hopper 2 has its front connected to cross beam 15 by means of brackets 81. In between brackets 81 and hopper supports 77, virtually in the same vertical plane as respective main frame beams 11 and hopper supports 77, there are provided braces 82.

Referring to FIGS. 3 and 4, close to each outlet openings 41 and 42 there are provided metering slides 86 and 87, respectively, by means of which respective outlet openings 41 and 42 can be optionally opened or closed to any extent. In this exemplary embodiment of the invention, metering slides 86 and 87 lie against the respective undersides of bottoms 37 and 38 of the corresponding outlet nozzles 3 and 4 of hopper 2. Metering slides 86 and 87 are placed symmetrically to center vertical plane 43 and in relation to this plane they are symmetrical in shape. Because metering slides 86 and 87 are identical, their utility will be further explained with reference to metering slide 86. Metering slide 86 has width 88 which is greater than width 57 of outlet opening 41. To be able to open or close respective outlet openings 41 and 42 to any selective extent, the respective metering slides 86 and 87 are mounted to frame 1 such that they are capable of reciprocating in a direction as indicated by arrow 89 (FIG. 4). Reciprocating motion 89 is parallel to normal direction of travel 49 of the implement during operation and also parallel to center vertical plane 43 of the implement.

Metering slide 86 is provided with finger-shaped support 90 (FIGS. 3,4 and 6) which is movably mounted between the underside of bottom 37 and supporting part 91. Supporting part 91 is made of synthetic material, e.g. nylon, and when viewed from above (FIGS. 4 and 5), it is rectangular. The long sides of part 91 extend perpendicularly to directions 49 and 89. Shown in FIG. 6, guide support 90 is in groove 92 formed on the top surface corner side and along the short side of supporting part 91. The underside of supporting part 91 is covered and supported by metal plate 93 which is attached to bottom 37 by means of fastening bolts 94 for supporting part 91. Guide support 90 extends in direction of motion 89. Side 99 of support 90 is parallel to side 55 of outlet opening 41. Viewed from above (FIG. 4), side 99 coincides with a vertical plane which coincides with side 55.

The side of metering slide 86 which operates in conjunction with outlet opening 41 is shaped by three sinuations 95, 96 and 97. Sinuations 95, 96 and 97 work in conjunction with passages 66, 67 and 68, respectively. In principle, the widths of sinuations 95, 96 and 97 virtually correspond with the widths of respective passages 66, 67 and 68. Measured along curved sides 52 and 53, sinuations 95, 95 and 97, according to the embodiment are as shown in FIG. 4. Both the deepest and the least deep portions of sinuations 95, 96 and 97 lie at least approximately on relevant imaginary curved ribbon 98 running parallel to curved sides 52 and 53 (seen in FIG. 4 with outlet opening 41, partially open). Width 88 of metering slide 86 is such that outlet opening 41 in the transverse direction is fully covered by slide 86 when outlet opening 41 is partly or fully closed.

Referring to FIGS. 3 and 4, beyond the perimeter of outlet nozzle 3, metering slide 86 is provided with two lugs 101 and 102, in which shaft 103 is bearing-supported. At one-half its length, shaft 103 is coupled to extension spring 104 which extends from shaft 103 upwardly and is connected with attaching eye 105 provided on the front of hopper 2. Spring 104 exerts a tractive force on shaft 103, and consequently on slide 86, so that the top surface of slide 86 as for the portion situated under bottom 37, is drawn to and against bottom 37. The portion of slide 86 which is on the other side of lugs 101 and 102 and shaft 103 than the portions which abuts against bottom 37, bears against curved sides 106 of sector-shaped support 107. In a sectional plan view (shown generally in FIG. 2) support 107 is U-shaped and comprises two side plates 108 and 109 and central part 110 interconnecting side plates 108 and 109. Central part 110 is bolted to mounting strip 111 rigidly attached to adjusting shaft 112. Curved sides 106 of side plates 108 and 109 are disposed eccentrically around the axis center line of adjusting shaft 112. Shaft 112 is supported in bearings 113 disposed on two hopper supports 77, as the arrangement is further shown in FIGS. 2 and 3. Shaft 112 is mounted in bearings 113 for rotation about its own longitudinal axis. Shaft 112 is secured against motion in longitudinal direction in relation to bearings 113. Central part 110 of support 107 is provided with slotted holes 114 (FIG. 3) to enable sector-shaped supports 107 to be adjusted parallel to adjusting shaft 112. Respective supports 107 can thus be adjusted correctly with respect to metering slides 86 and 87 when they are coupled with them.

Metering slide 86 is hinge-connected with sector-shaped support 107. To this end, shaft 103 is by means of connecting member 116, H-shaped in a plane view (FIG. 2), connected with hinge shaft 117 which extends between side plates 108 and 109 and is mounted in plates 108 and 109. The legs of this H are provided with holes, through which respective shafts 103 and 117 extend such that shafts 103 and 107 are bearing-supported in the relevant legs of H-shaped connecting member 116 and are capable of rotating in relation thereto.

Adjusting shaft 112 is provided with adjusting arm 118 which is connected with an adjusting mechanism (not shown). The nature of the adjusting mechanism is optional, for instance, the adjusting mechanism may be manually operated or controlled by a computer. This adjusting mechanism serves to move, in the manner as desired, slide 86 and corresponding slide 87 in either direction of forward/ backward motion for further closing or opening respective outlet openings 41 and 42, as the case may be, through the mentioned connection between adjusting arm 118 via adjusting shaft 112 and sector-shaped supports 107. Slide 87 is arranged and connected with adjusting shaft 112 in the same way as is described with regard to slide 86. Accordingly, corresponding parts are indicated by the same reference numbers. In respect of their situation and further design, metering slides 86 and 87 with their connecting members 116 and adjusting shaft 112 are of a symmetrical form with respect to the center vertical plane 43.

Figure 5:
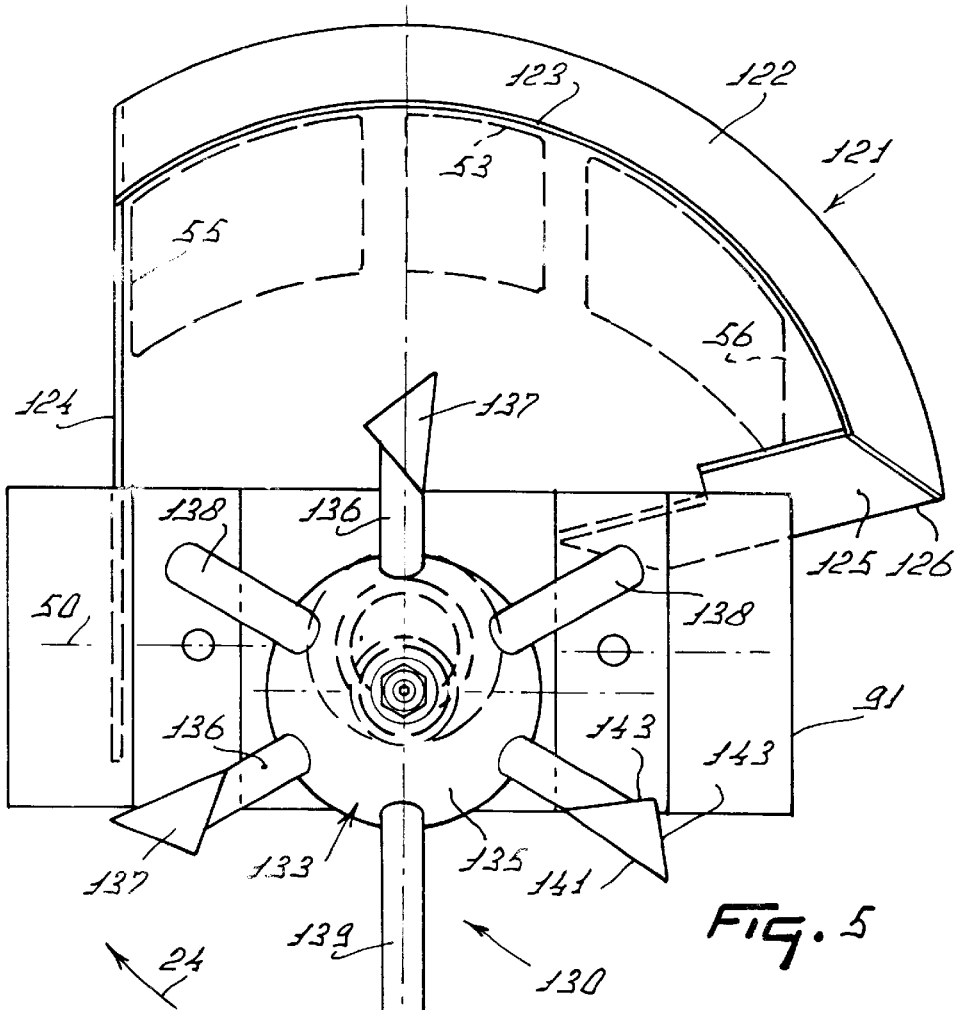
FIG. 5 is a plan view of a stirring member in the hopper, a section of the hopper, a guard provided at the outlet opening, and a supporting member.

Between bottom wall parts 37 and 38 and respective spreading members 5 and 6 situated under them, there are provided guard members in the form of guard flanges 121. Guard flanges 121 are placed under outlet nozzles 3 and 4, where they connect to the perimeter of outlet openings 41 and 42, respectively. Guard members 121 under respective outlet nozzles 3 and 4 are symmetrical with respect to longitudinal plane 43. In view of this, the shape of guard member 121 disposed under outlet nozzle 3 will be further detailed, especially with reference to FIG. 5. Guard member 121 comprises curved part 122 designed as a guard flange, whose top side (or edge) 123, associates with the underside of the perimeter of outlet openings 41, and metering slide 86. Here, top edge 123 is at approximately the same level as the horizontal side of groove 92 in which finger-shaped support 90 of metering slide 86 is placed. Edge 123 is just outside of perimeter curve 53 of outlet opening 41, indicated by a dashed line in FIG. 5. Guard part 122 extends from top edge 123 obliquely downwardly such that it diverges from rotary axis 45, as is apparent from FIG. 6. Near side 55 of opening 41, curved guard part 122 connects to straight guard part 124 situated next to side 55 and beyond opening 42, as seen in plan view (FIG. 5). Straight guard part (or flange) 124 extends vertically and is oriented parallel to plane 47. Straight guard part (or flange) 124 extends from curved guard part 122 rearward to underneath finger-shaped support 90 and beyond transverse plane 50. At the other end of curved guard part 122 which extends to just beyond edge 56 of opening 41, curved guard part 122 connects to slightly radially oriented guard part 125. Part 125 constitutes a guard flange which is directed obliquely downwardly from top to bottom. Guard part 125, as is shown in a plan view (FIG. 5), is directed obliquely downwardly and away from opening 41. As is apparent from FIGS. 5 and 6, guard member 121 is connected with bottom 37 through the ends of guard parts 124 and 125 fastened to the underside of plate 93. Guard member 121 reaches downwardly, from top side 123 connecting with the underside of metering slide 86 to a level just higher than central part 76 of respective spreading members 5 and 6 and to a short distance from top edge 23 of spreading blades 18. This distance from the underside of guard member 121 to top edges 23 of spreading blades 18 mounted on respective spreading members 5 and 6 will amount to a few millimeters, e.g. 3 mm. This distance shall not be less than is necessary to keep clear of top edges 23 and will be at most about 6 mm. Lower edge 126 of radial guard part 125 is essentially radial to respective rotary axis 45 and 46 of respective spreading members 5 and 6 situated under relevant outlet parts 3 and 4 of hopper 2 as is apparent from FIG. 5. As is also shown in FIG. 5, radial guard part 125 is also directed obliquely downwardly so that curved guard part 122 and guard part 125 diverge from each other. Guard parts 124 and 125, whose ends are attached to the underside of plate 93, have their top edges situated beyond supporting parts 91 which is at the same level as edge 123 and these top edges also are received by the respective undersides of metering slides 86 and 87, especially when the corresponding outlet opening 41 or 42 is shut off by respective slides 86 and 87.

Referring to FIGS. 3 and 5, in the bottom zone of the hopper, especially in outlet nozzles 3 and 4, there are provided delivery members 130 in the shape of stirring members which keep the material loose in respective outlet nozzles 3 and 4 during operation, thus preventing outlet nozzles 3 and 4 from becoming clogged. Delivery members 130, disposed in outlet nozzles 3 and 4, are identical to each other and are symmetrically arranged with respect to center vertical plane 43. Therefore, only stirring member 130, as installed in outlet nozzle 3 and particularly depicted in FIGS. 3 and 5, will be further described. FIG. 5 shows a plan view of stirring member 130 together with supporting part 91 and guard member 121. The location of guard member 121 and that of stirring member 130 in relation to outlet opening 41 are further shown by outlet opening 41 being drawn in dashed lines in FIG. 5.

Figure 6:
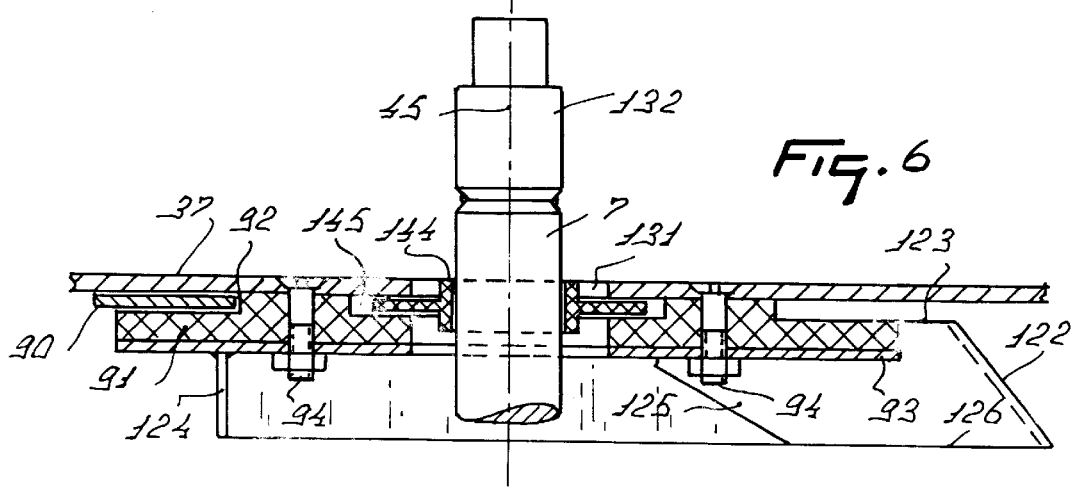
FIG. 6 is a sectional elevational view of the guard and the supporting member for the metering slide.

As is apparent from FIGS. 3 and 6, shaft 7 of spreading member 5 extends through hole 131 in bottom 37. Shaft 7 is at its upper end provided with eccentric shaft 132 disposed eccentrically with respect to rotary axis 45. Eccentric shaft 132 is fixed to shaft 7. On the upper end of eccentric shaft 132, which is approximately at the level of top edge 33 of outlet nozzle 3, stirring member 130 is rotatably mounted. Stirring member 130 comprises carrier 133 which has cylindrical lower part 134 and conical part 135 tapering towards the top. Carrier 133 is capable of rotation about eccentric shaft 132 constituting an axle for stirring member 130. Distributed around the lower end of conical part 135 are carrying arms 136 with stirring means 137 fastened to their ends. Means 137 are triangular in section and in plan view. Means 137 extend vertically, reaching to a height slightly higher than one-half the height of conical part 135 and reaching to a depth beyond the lower end of carrier 133. Lower ends of stirring means 137 are at approximately one-half the height of outlet nozzle 3. The top sides of stirring means 137 extend in the lower zones of funnel-shaped parts 31 of hopper 2. Carrying arms 136 are at the height of the top of outlet nozzles 3. Centrally disposed between two adjoining carrying arms 136, two stirring arms 138 are fitted on carrier 133. At the level of the lower side of conical parts 135, stirring arms 138 are attached thereto and extend downwardly parallel to this conical surface. The lower ends of stirring arms 138 are at approximately the same level as the lower ends of stirring means 137. Centrally disposed between two carrying arms 136 where no stirring arm 138 is provided, there is provided stirring arm 139. Stirring arm 139 extends horizontally from the lower end of conical part 135 to near top edge 33 of outlet nozzle 3. In this position at top edges 33, stirring arms 139 has bent-down part 140 which reaches to just above bottom 37 of outlet nozzle 3 and which is parallel to the cylindrical wall part of outlet nozzle 3, as the arrangement is shown by FIG. 3. As is apparent from FIG. 5, the triangular shape of stirring means 137, as seen in a plan view, includes side 141 which is virtually radial to center line 142 of stirring member 130. The two remaining sides 143 of stirring means 137 are equal, so that two sides 143 and bottom side 141 make up an isosceles triangle. In FIG. 5, bottom sides 141 are forward of sides 143 in relation to direction of rotation 24 of spreading member 5.

Around the mutually facing sides of two spreading members 5 and 6 there are provided guide flanges 146 and 147, respectively. Guide flanges 146 and 147 are situated around a part of the circumference of respective spreading members 5 and 6 as is apparent from FIG. 2. Their rear parts reach to beyond the rear side of respective outlet nozzles 3 and 4, while their front parts reach to beyond the front side of the respective spreading members 5 and 6. on top of guide or guard flanges 146 and 147 there is provided guard plate 149 which extends between outlet nozzles 3 and 4 and over approximately the same length as indicated with regard to guide flanges 146 and 147. Guard plate 149 extends horizontally and it is bent down on the front side, where this front part, in common with guard flanges 146 and 147, extends downwards as far as the level of the underside of respective broadcasting plates 16 and 17. Guard plate 149 and top edges 148 of guide flanges 146 and 147 are at a level slightly above respective underside 37 and 38 of respective outlet nozzles 3 and 4 (shown in FIG. 3 around outlet nozzles). Guard flanges 146 and 147 and guard plate 149 are attached to support 150 disposed on the lower end portion of stay 28 (FIGS. 1 and 2). On the side of metering slide 86 not facing other metering slide 87 as well as on the side of metering slide 87 not facing metering slide 86 is provided side guard plate 151 (FIG. 2), which is at the same level as guard plate 149 and extends longitudinally parallel to plane 43 over the same distance as guard plate 149 and guide flanges 146 and 147. On the front, side guard plates 151 have front sides 152 which are directed downwardly and which extend over the same height as guard flanges 146 and 147, as the arrangement is shown in FIG. 3. Attached to front side 152 there are projections 153, through which side guard plates 151 are fastened to the fronts of guard flanges 146 and 147 by means of bolts 154. Side guard plates 151, with the side facing respective outlet nozzles 3 and 4, are partly situated around the circumference of respective outlet nozzle parts 3 and 4. Side guard plates 151 are connected to respective hopper supports 77 by means of brackets 160 (FIGS. 1 and 2).

Referring to FIGS. 3, 4 and 6 regarding outlet nozzle 3, the hole 131 in the respective bottoms 37 and 38, which is considerably wider than the diameter of the corresponding respective shaft 7 or 8, is sealed around shafts 7 and 8 by means of sealing ring 144 which is movable in lateral direction in recess 45 provided in supporting part 91, as the arrangement is shown in FIG. 6. Owing to the fact that hole 131 is wide by comparison with shafts 7 and 8, shaft 7 or 8 together with axle 132 attached eccentrically thereto can be extended through hole 131 into hopper 2. The implement is especially designed for spreading material over a surface while it is travelling over this surface. For this purpose, the implement is capable of being connected to the lifting device of a tractor or similar vehicle by means of coupling members 13 and 14 (FIG. 2). Drive shaft 12 can then be coupled to the power take-off shaft of the tractor through an intermediate shaft, so that during operation spreading members 5 and 6 can be rotated. During operation, the material is carried in hopper 2 and fed therefrom to the then rotating spreading members 5 and 6. During operation, spreading members 5 and 6 rotate in mutually opposite directions 24 and 25. Here, the mutually adjacent sides of two spreading members 5 and 6 move in normal operational direction of travel 49 of the implemtent.

Outlet openings 41 and 42 are symmetrically situated with respect to center vertical plane 43. The size of respective openings 41 and 42 has been chosen, and the shape of the same has been designed such that, over a relatively large angle around rotary axis 45 and 46 of spreading members 5 and 6, the material is supplied to the spreading members and can be broadcast over a large angle. In this exemplary embodiment, openings 67 and 68 are approximately 65 m, and opening 66 is approximately 45°. Preferably, the sum of these angles shall not be less than 80° and not be more than 140°. Partly owing to its shape, each of spreading members 5 and 6 spreads material over an angle of about 180° round its rotary axis 45 and 46. At the front of spreading members 5 and 6 material is spread essentially transversely to direction of travel 49, from the front of right-hand spreading member 5 to the right and from the front of left-hand spread member 6 to the left. The two spreading members 5 and 6 broadcast the material at the front side in opposite divergent directions. At the rear of spreading members 5 and 6, material is also spread essentially transversely to direction of travel 49, but in opposite direction as compared with the front side. The two spreading members 5 and 6 each throw the material over approximately the same distance on both sides of vertical plane 43, so that the distribution patterns of the two spreading members 5 and 6 mirror each other virtually completely. The form and size of outlet openings 41 and 42 have been chosen and, partly in view of the form of respective spreading members 5 and 6, the location of openings 41 and 42 is such that most types of fertilizer or other equivalent materials can be spread in a uniform distribution. The two spreading members 5 and 6, spread material to both sides of center vertical plane 43 such that the material as a whole is evenly spreadable over a wide strip when the implement is moving forward over the field to be covered. With this, a uniform spread is achieved no matter whether more or less material is spread per unit of time or per unit of area, as the case may be.

The amount of material capable of flowing through outlet openings 41 and 42 per unit of time is adjustable by closing or opening them further by means of respective metering slides 86 and 87. The edges of metering slides 86 and 87 operating in conjunction with respective outlet openings 41 and 42 in closing or opening them to any extent, are zigzag-shaped. This provides the formation of sinuations 95, 96 and 97. Sinuations 95, 96 and 97 have been shaped so that each of them operates in conjunction with one of respective outlet openings parts 66, 67 and 68. Sinuations 95, 96 and 97 have been formed so that even when a very small size of passage of each of outlet openings 41 and 42 is desired, each of parts 66, 67 and 68 forms an opening with a small-size passage. These small passage openings are then formed by curved edge 52 of opening 41 or 42 and respective sides of sinuations 95, 96 and 97 or parts thereof, as the case may be.

So, even when very small quantities per unit of time are allowed to flow from hopper 2 through outlet openings 41 and 42, material will flow to respective spreading members 5 and 6 over a wide angle about respective rotary axes 45 and 46 of the respective spreading members 5 and 6. Accordingly, when small quantities of material per unit of time are to be spread, the material will still be capable of being spread over the full broadcasting angle of approximately 180° by each of spreading members 5 and 6, whereby a desired distribution over the strip to be covered is feasible, when travelling in direction 49. Curved edge 52 is a closing or sealing edge, over which the deepest parts of sinuations 95 to 97 are moved when a respective outlet 41 or 42 is being closed completely. Also, all this can be achieved when intermediate strips 69 and 70 are omitted.

Metering slides 86 and 87 are easily operable by an adjusting mechanism, to which they are connected through the shown constructions comprising sector-shaped supports 107, connecting members 116 and adjusting shaft 112. Metering slides 86 and 87 can easily move forward and backward, because they are under pressure abutting bottoms 106 of sector-shaped supports 107. This motion is guided by the position of respective finger-shaped supports 90 in grooves 92 of supporting parts 91. Spring 104 keeps metering slides 86 and 87 bear in a suitable manner against the underside of respective bottoms 37 or 38 for appropriate connection of metering slides 86 and 87 to the bottom of outlet openings 41 and 42. Furthermore, metering slides 86 and 87 are appropriately supported by curved sides 106 of sector-shaped supports 107, which is maintained when the shaft 112 is rotated and curved sides 106 roll on the top surface of respective metering slides 86 and 87. The desired motion of metering slides 86 and 87 can be controlled by an adjusting mechanism, which may be of any design and which is coupled to adjusting shaft 112 through adjusting arm 118. Finger-shaped support 90 fits loosely in groove 92 such that any material landing between bottoms 37 and 38 and respective metering slides 86 and 87 does not jam respective metering slides 86 and 87. Material which has landed between bottom 37 and 38 and respective metering slides 86 and 87 can be eliminated by moving respective metering slides 86 and 87 forwards and backwards.

Suitability of the supply of material from hopper nozzles 3 and 4 via respective outlet openings 41 and 42 is ensured by stirring member 130. Rotation of spreading members 5 and 6 causes stirring member 130 to move in outlet nozzles 3 and 4 through the eccentric motions of eccentric shaft 132 about respective center lines 45 and 46 of corresponding shafts 7 and 8 of spreading members 5 and 6. In dependency of the resistance met by stirring member 130 in the material provided at the bottom of hopper 2, stirring member 130 with stirring arms 136, 137 and 138 attached to it will make a motion governed by the eccentricity of eccentric shaft 132 of shaft 7. Should a more or less hollow space or cavity come into being in or just above outlet nozzles 3 and 4 of hopper 2 because the material does not sufficiently flow in the direction to outlet openings 41 or 42, then stirring member 130 will rotate about center line 142 of eccentric shaft 132. This will keep the material sufficiently loose and prevent the material from clogging respective outlet nozzles 3 and 4 or respective hopper funnels 31 and 32, as the case may be.

Material delivered through outlet openings 41 and 42 is, within the contour of guard member 121, fed to relevant spreading members 5 or 6. Here, guard member 121 acts as a guide for the material, so that e.g. in the event of heavy oscillating motions of the implement, the material can still flow to the desired supply point of respective spreading members 5 or 6. Furthermore, guard member 121 has its function to prevent that granules which come into contact with respective spreading members 5 or 6 with blades 18, fly about in an undesired manner. Guard member 121 keeps the material in the vicinity of the inner ends of spreading blades 18 in order to have it spread in the desired way via spreading blades 18. A smooth reception of the material by this respective spreading member 5 or 6 is advantageously influenced by the lower inner part of spreading blades 18 and narrow top side 23 thereof. Guard member 121 limits the flow of material to top edges or sides 23 of the lower inner parts of spreading blades 18. This ensures a suitable/flow of material from respective outlet openings 41 and 42 to corresponding spreading members 5 and 6. The material can thus be appropriately scattered by spreading blades 18 so as to obtain a uniform spread of material. Front sides 152 of side guard plates 151 and the rear ends of guard flanges 146 and 147 are situated such that two spreading members 5 and 6 are capable of spreading the material advantageously over the large spreading angles of approximately 180°.

Spreading members 5 and 6 are further screened off by guard plates 149 and 151 and guard flanges 146 and 147. These guard parts prevent air streams caused by wind or similar things from adversely affecting the broadcasting of material. Further, rebounding granules will not be spread in an undesired manner.

As shown in FIGS. 1 and 3, below adjusting shaft 112 and between the front of guard plates 149 and 151 and the front of sector-shaped supports 107 there is provided guard member 158. Member 158 is suspended from shaft 112 and extends downwards to beyond the front of guard plates 149 and 151 and sector-shaped supports 107. Guard member 158 extends virtually over the full length between hopper supports 77. Guard member 158 is suspended from adjusting shaft 112 by means of hook-shaped parts 159. Hook-shaped parts 159 are mounted freely rotatable about adjusting shaft 112, so that guard member 158 remains hanging downwards over the front of guard plates 149 and 151 in case adjusting shaft 112 is adjusted. Guard member 158 is preferably made of flexible material and its top side connects to the circumference of adjusting shaft 112.

As mentioned hereinbefore, metering slides 86 and 87 can be operated by rotating adjusting shaft 112 by means of arm 118. Although the mentioned position of metering slides 86 and 87 can be obtained in numerous manners by setting and locking arm 118, such as by means of sector-shaped plates mounted on frame 1 and, along the edge, provided with a series of adjusting holes, in relation to which arm 118 can be rotated and locked, in FIGS. 7 and 8 there is depicted an embodiment wherein one of metering slides 86 and 87 is adjustable, whereas the other one is kept in a fixed position. Accordingly, one metering slide 86 or 87 can fully shut off one outlet opening 41 or 42, whereas the other one can be adjusted to a desired spread pattern; in this situation, a spread pattern towards only one side can be obtained, which is of importance to the so-called "fringe spreading".

Figure 7:
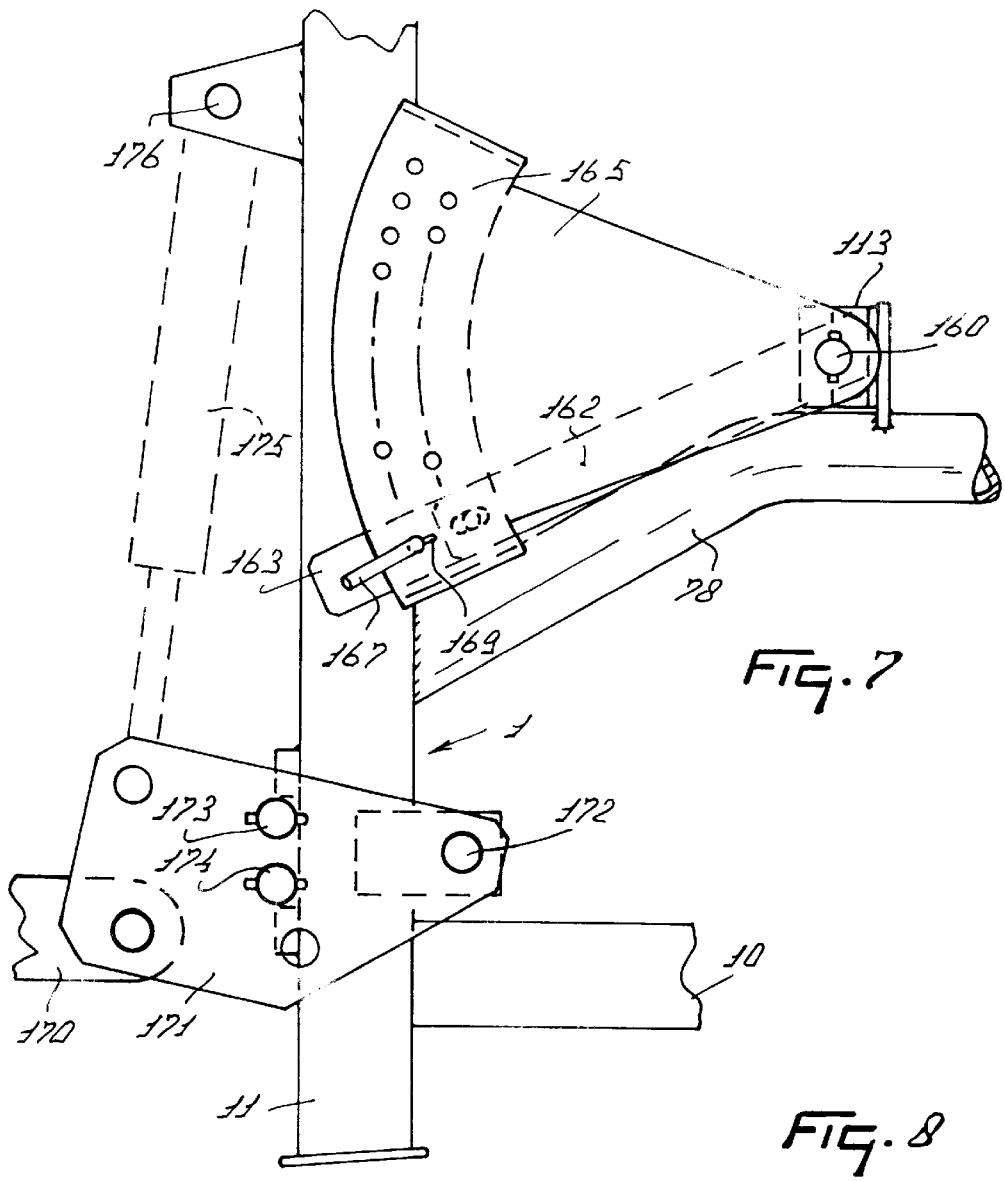
FIG. 7 shows an elevational view of the locking mechanism for the metering slides.
Figure 8:
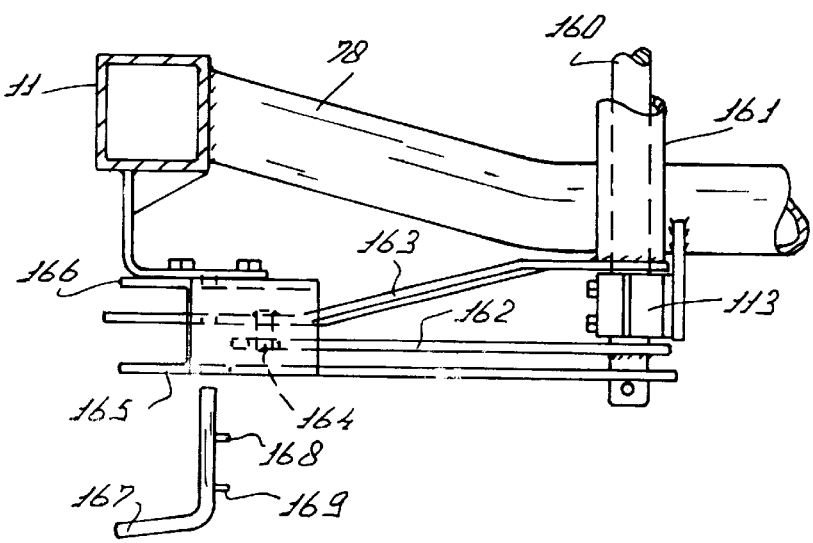
FIG. 8 shows a top view of this locking mechanism.

In the embodiment represented in FIGS. 7 and 8, instead of adjusting shaft 112, there are provided two concentrically extending adjusting shafts 160 and 161. A metering slide (not shown) is adjustable by means of respective adjusting shaft 160 or 161 in the same manner as by means of adjusting shaft 112 for the two metering slides 41 and 42 as described hereinbefore. Again, adjusting shaft 160 is supported in bearings 113. In the same manner as arm 118 is mounted on adjusting shaft 112, arm 162 is mounted on adjusting shaft 160 and arm 163 is mounted on adjusting shaft 161. Arm 163 is longer than arm 162 and is spring-loaded in the sense that arm 163 is urged towards or against arm 162. Due to the fact that arm 163 is provided with protruding pin 164 which goes into a hole in arm 162, the two arms 162 and 163 are mutually fixed and the two metering slides 41 and 42 are moved by actuating respective arms 162 and 163. During rotation, arms 162 and 163 can be moved along sector-shaped plates 165 and 166 provided with holes and rigidly attached to frame 1, and then be fixed relative to plates 165 and 166, in a desired position. The two arms 162 and 163 can be uncoupled by means of pin 167. In the embodiment of the invention shown here, this is only practicable in the lowest position of arms 162 and 163; in this lowest position, the two metering openings 41 and 42 are closed. The lowest hole in plate 165 from where pin 167 can be centered through the two plates 165 and 166 and arm 163 has an additional recess for protrusions 168 and 169 on pin 167. In a particular position, pin 167 can be inserted through plate 165 and subsequently through arm 163 until first protrusion 168 strikes arm 163, whereupon, as pin 167 is pushed further, arm 163 is pushed in the direction of plate 166 and is released from arm 162. Finally, when pin 167 has been inserted through plate 166, this can be rotated and pin 167 is fixed by second protrusion 169 which, bearing against the interior wall of plate 165, prevents pin 167 from being pushed out again. Arm 163 is now fixed in relation to plates 165 and 166, while arm 162 is freely rotatable, so that the respective corresponding metering slides 41 or 42 can be actuated through adjusting shaft 160.

For the purpose of placing the implement according to the invention into an oblique position, which is of importance to the so-called "fringe spreading", there is a pivotably mounted tilting plate 171 between one of lower lifting arms 170 of the lifting device of the tractor and one of main frame beams 11 (FIG. 7). Tilting plate 171 is connected pivotably by a pin 172 with main frame beam 11 and has three holes, where, in the position as shown in FIG. 7, a pin 173 and a pin 174 are inserted in the two upper holes, and in such manner the position of plate 171 is fixed in relation of main frame beam 11. When top pin 173 is removed, tilting plate 171 rotates and main frame beam 11 is lowered a little to the point where pin 174 blocks any further downward motion. By subsequent insertion of pin 173 into the lowest hole, the position of tilting plate 17 is again fixed in relation to main frame beam 11. Due to the fact that such a mechanism is only provided on one side of the implement, the implement is suspended in an oblique position behind the vehicle carrying same. It will be obvious that, instead of making use of three holes in tilting plate 171 and corresponding pins 173 and 174, a more expensive solution of providing an actuating piston and cylinder mechanism 175 can be chosen, which piston and actuating cylinder mechanism 175 should then be placed between tilting plate 171 and a support 176 attached to main frame beam 11. In FIG. 7, this piston and cylinder mechanism 175 is drawn in dashed lines.

Although this invention has been disclosed and discussed primarily in terms of specific embodiments thereof, it should be understood that this description has been given for clearness of understanding only, and no unnecessary limitations should be understood therefrom, for modifications that will be obvious to those skilled in the art will be within the spirit and scope of the following claims.

Having disclosed our invention what we claim as new and to be secured by Letters Patent of the United States is:

1. An implement for spreading granular material,
    said implement comprising a hopper,
        said hopper having a wall, an outlet opening in said wall, at least one spreading member underlying said hopper,
        a metering slide capable of moving forward and backward along said wall and selectively opening and closing said outlet opening,
        said metering slide being urged to abut against said wall, said metering slide including a portion that extends beyond said wall,
        a sector-shaped support having a curved side which is urged in an abutting relationship against said portion, sid curved side rolling along aid portion as said portion moves with the remainder of said metering slide selectively to open and close said outlet opening.

2. An implement according to claim 1 comprising a connecting member, said connecting member connecting sid metering slide to said sector-shaped support and an adjusting shaft, said sector-shaped support being pivotally mounted on said adjusting shaft for moving said metering slide.

3. An implement according to claim 2, comprising an adjusting mechanism coupled to said adjusting shaft, by means of which the discharge of the desired amount of material per unit of time from said hopper to the spreading device is controllable by selectively adjusting the effective size of said outlet opening by selectively opening or closing said outlet opening to a greater or lesser extent by means of said metering slide.

4. An implement according to claim 3, further comprising a plurality of said outlet openings, a plurality of said metering slides, a plurality of said adjusting shafts and a plurality of said adjusting mechanisms,
    each said outlet opening of said plurality of outlet openings comprising a respective said metering slide,
    each said metering slide comprising a respective said adjusting shaft, and
    each said adjusting shaft comprising a respective said adjusting mechanism,
    each said adjusting mechanism comprising connective means for operatively coupling it to another said adjusting mechanism whereby said discharge of said material from said respective outlet openings is controllable in unison when said adjusting mechanisms are operatively coupled by said connective means.

5. An implement according to claim 4, wherein said connective means further comprises means for selectively uncoupling one or more said adjusting mechanisms.

6. An implement according to claim 2, wherein said connecting member, disposed between said metering slide and said sector-shaped support, comprises a hinge-connection with said sector-shaped support and a further hinge-connection with said metering slide.

7. An implement according to claim 6, wherein said connecting member, as seen in a plan view, is a H-shaped plate, the respective ends of said H-shape plate's legs which are oriented in a first direction are coupled with said sector-shaped support and the respective ends of said H-shape plate's legs which are oriented in a second direction are coupled with said metering slide, said resilient member being coupled with said further hinge connection.

8. An implement according claim 2, further comprising a flexible guard member, said flexible guard member pivotally connected to said adjusting shaft, so that when said flexible guard member is pivoted downwardly, said flexible guard member extends from said adjusting shaft to an area in front and below said sector-shaped support.

9. An implement according to claim 1, comprising a resilient means forcing said metering slide against said wall, said resilient means comprising a resilient member between said wall and said sector-shaped support connected to said metering slide.

10. An implement according to claim 9, wherein said resilient member comprises an extension spring, one end of which is connected to said metering slide.

11. An implement according to claim 1, wherein said sector-shaped support is U-shaped, when viewed in plan view, the legs of said U-shape being two supporting plates which are sector-shaped when viewed in elevational view, the curved sides each abutting against said metering slide.

12. An implement according to claim 1, wherein said wall comprises a bottom plate of said hopper.

13. An implement according to claim 12, wherein said bottom plate is a flat plate extending substantially perpendicularly to the axis of rotation of said spreading member.

14. An implement according to claim 12, wherein said wall constitutes a bottom plate of a material agitation and discharge nozzle of said hopper.

15. An implement according to claim 1, wherein said metering slide further comprises a protrusion, and said wall further comprises a supporting part connected thereto and said supporting part comprising a groove disposed between a portion of said supporting part and said wall, said groove receiving said protrusion, said protrusion and said groove cooperating to guide the movement of said metering slide.

16. An implement according to claim 15, wherein said supporting part is rectangular and at least one of the sides of said supporting part comprises said groove wherein said protrusion of said metering slide is slidably received.

17. An implement according to claim 15, wherein a side of said protrusion, as seen in a plan view, substantially coincides with a plane that coincides with a side of said outlet opening.

18. An implement according to claim 1, further comprising an adjusting shaft, a plurality of said spreading members, a plurality said metering slides, and a plurality said sector-shaped supports, said hopper comprising a plurality of outlet nozzles, each said spreading member associated with a respective said outlet nozzle of said hopper, said respective outlet nozzle including at least in part said wall and comprising at least said one outlet opening in said wall, and wherein each said metering slides operates in association with a respective said outlet opening of said respective outlet nozzle, means urging said metering slide against said wall, and each said metering slide is associated with a corresponding said sector-shaped support, each of said metering slides abutting against a said curved side of a said corresponding sector-shaped support, each said sector-shaped support associated with a corresponding said metering slide being coupled to said adjusting shaft and being simultaneously adjustable by said adjusting shaft.

19. An implement according to claim 18, wherein said plurality of metering slides and the said corresponding sector-shaped supports and said outlet openings are shaped and arranged symmetrically in relation to a vertical plane extending centrally between two said adjacent outlet nozzles.

20. An implement according to claim 18, wherein each said metering slide further comprises a protrusion, and said wall further comprises a plurality of supporting parts, each said supporting part being supported on said wall and each said supporting part comprising at least one groove which is associated with a corresponding said protrusion and each said groove is disposed between part of said corresponding supporting part and said wall, each said groove receiving a corresponding said protrusion, each set of said protrusions and said grooves cooperating to form a guide member for each said corresponding metering slide and, two sets of said grooves and said protrusions being symmetrically arranged.

21. An implement according to claim 18, wherein said plurality of spreading members and corresponding outlet openings of said corresponding outlet nozzle are constructed and arranged so that said spreading members each broadcast material over different sections of the same strip during said implement's spreading operations.

22. An implement according to claim 18, wherein said outlet opening of each said outlet nozzle extends to either side of a corresponding plane, said corresponding plane containing a corresponding rotary axis of a said spreading member underlying said outlet nozzle, each said plane extending substantially parallel to a forward direction of operational travel of said implement, each said corresponding plane bisecting its corresponding outlet nozzle's outlet opening to define an inboard section of such outlet opening and an outboard section of such outlet opening, said outboard section of said outlet opening extending away from said plane more than said inboard section.

23. An implement according to claim 18, further comprising a plurality of guide plates, each said guide plate being connected to said wall and associated with a respective spreading member, each said guide plate is disposed partially around a perimeter of said respective spreading member, said perimeter of said respective spreading member facing the perimeter of another said spreading member, said guide plate providing means for preventing the broadcast of said granular material from said spreading member to said another spreading member.

24. An implement according to claim 1, wherein said outlet opening comprises a first side and a second side and said metering slide further comprises an edge which operates in conjunction with said first side of said outlet opening for the purpose of selectively closing or opening said outlet opening by an adjustable amount, said edge comprises a plurality of indentations which cooperate with, at least after partial closure of said outlet opening, said first side of said outlet opening to form a plurality of passages.

25. An implement according to claim 24, wherein each of said indentations, viewed in plan view is V-shaped, wherein two diverging sides of said V-shape facing said first side of said outlet opening are disposed such that, when the outlet is being closed by said metering slide and the most outboard part of each said indentation moves past said first side of the outlet opening, said outlet opening is fully closed by said metering slide.

26. An implement according to claim 24, wherein each said indentations for a corresponding said passage differ from each other in size and shape.

27. An implement according to claim 24, wherein there are three of said passages and a corresponding indentation for each passage, said indentations disposed side-by-side whereby a central said indentation has on each side thereof an adjoining said indentation, said central indentation being smaller in width than two adjoining said indentations, said two adjoining indentations being approximately of equal width.

28. An implement according to claim 27, wherein said central indentation has a width which is approximately one-half that of said two adjoining indentations.

29. An implement according to claim 24, wherein said indentations and said outlet opening are arranged in arcs which have approximately equal radii.

30. An implement according to claim 29, wherein said outlet opening comprises an arc which centers on the rotary axis of said spreading member.

31. An implement according to claim 29, wherein said arcs extend around the rotary axis of said spreading member over an angle which is in the range of approximately 80° to approximately 140°.

32. An implement according to claim 31, wherein said outlet opening extends to either side of a plane, said plane containing said rotary axis of said spreading member and being essentially parallel to the forward direction of operational travel of said implement, said plane bisecting said outlet opening to define an inboard section of said outlet opening and an outboard section of said outlet opening, and said outboard section of said outlet opening extending away from said plane more than said inboard section.

33. An implement according to claim 1, wherein said spreading member further comprising a spreading blade, said spreading blade comprises an inner end part which, in operation, rotates under said outlet opening and an outer part from which material being spread by said implement is discharged, said inner end part being lower than said outer part.

34. An implement according to claim 33, wherein said outer part of said spreading blade comprises an upper flange extending substantially perpendicularly to the rotary axis of said spreading member, said upper flange extending in the same direction as the operational direction of rotation of said spreading blade.

35. An implement according to claim 33, wherein said inner part comprises a lower flange which is disposed obliquely downwardly toward the axis of rotation of said spreading member.

36. An implement according to claim 33, wherein said spreading member comprises an inverted conical plate, said inverted conical plate's interior, at said plate's center, comprising a raised, central part, said blade being mounted on said plate, said inner end connected to said raised central part.

37. An implement according to claim 33, wherein said inner end part, as measured in a radial direction from said spreading member's axis of rotation, is shorter than said outer part.

38. An implement according claim 1, further comprising a guard flange disposed between said wall and said spreading member, said guard flange disposed partially around and beyond the outboard perimeter of said outlet opening, said guard flange comprising a barrier means to prevent misdirection of the flow of said granular material from said outlet opening to said spreading member.

39. An implement according to claim 38, wherein said guard flange comprises a top side, said top side being disposed substantially a short distance below an outboard edge of said outlet opening, wherein said outboard edge comprising an edge of said outlet opening disposed farthest from the axis of rotation of said spreading member, said short distance being defined substantially by said metering slide's thickness, said metering slide being slideably received between said top side and said wall.

40. An implement according to claim 38, wherein said guard flange diverges downwardly relative to said center axis of rotation of said spreading member and comprises a lower edge, said lower edge being disposed a short distance above a top of a downward, inboard step of a spreading blade and lower than the top outboard part of said spreading blade, said spreading blade being substantially radially disposed on said spreading member.

41. An implement according to claim 38, wherein said guard flange comprises a straight guard part, said straight guard part being disposed substantially parallel to a vertical plane and being outside of the operational travel of said metering slide, said vertical plane being substantially parallel to the axis of rotation of said spreading member and extending in a forward direction of operational travel of the implement, said straight guard part being rigidly interconnected to said wall.

42. An implement according to claim 38, wherein said guard flange comprises a substantially radial guard part, said substantially radial guard part disposed substantially radially relative to the axis of rotation of said spreading member and being outside the operational travel of said metering slide, said radial guard part further being rigidly interconnected to said wall.

43. An implement according to claim 1, further comprising, a stirring member disposed above said outlet opening, said stirring member being rotatably mounted on an axle, said axle eccentrically connected to a rotary shaft of said spreading member, said stiffing member comprising stirring means, said stirring means stirs granular material in said hopper above said outlet opening as said shaft rotates.

44. An implement according to claim 43, wherein said stirring means comprises a plurality of stirring bodies which are triangularly in section and are connected, by a carrying arm to a carrying member rotatably mounted on said axle.

45. An implement according to claim 43, wherein said stirring means comprises a stirring arm, said stirring arm being connected to a carrying member said carrying member being rotatably mounted on said axle, said stirring arm being disposed directed obliquely downwards from said carrying member.

46. An implement according to claim 43, wherein said stirring means comprises a stirring arm, said stirring arm being connected to a carrying member, said carrying member being rotatably mounted on said axle, said stirring arm extending from said carrying member first in a substantially horizontal direction and thereafter extending vertically downwardly.

47. An implement according to claim 43, wherein said rotary shaft extends through said wall via a hole therein and a sealing ring in said hole that surround said rotary shaft.

48. An implement according to claim 1, further comprising a guard part connected to said wall and extending substantially downwardly therefrom, said guard part extending partially around said spreading member, said guard part preventing broadcast of said granular material from where said guard part is disposed.

49. An implement according to claim 48, wherein said guard part further comprises a front-side guard flange, said front-side guard flange extending substantially in a downward direction in front of said spreading member to a level below said spreading member.

50. An implement for spreading granular material comprising;
 a hopper and a metering slide,
  said hopper comprising a wall,
   said wall comprising an outlet opening,
    said outlet opening providing means for passage of granular material through said wall,
   said metering slide comprising adjustment means for adjustably obstructing said means for passage though said wall, said metering slide comprising a portion thereof that is slidable on said wall and a further portion thereof which is cantilevered from said wall, said metering slide comprising a plate, said plate comprising an indented edge, said indented edge being asymmetric when viewed in plane, said metering slide further comprising a guide, said guide slidably connected to said wall, said metering slide still further comprising a sector-shaped support, said sector-shaped support disposed over and connected to said further portion of said metering slide which is cantilevered from said wall, said sector-shaped support comprising a connecting member, said connecting member comprising a first end and a second end, said first end pivotally connected to said metering slide, said second end pivotally connected to said sector shaped support, said sector-shaped support providing movement means slideably to move said metering slide along said wall, said sector-shaped support yet still further comprising adjustment means for pivoting said sector-shaped support and slideably moving said metering slide to a position on said wall that selectively fully or partially obstructs said passage through said outlet opening or does not obstruct said passage, said metering slide further comprising means of urging said metering slide against said wall, said urging means comprising an extension spring.

51. An implement as claimed in claim 50 further comprising a spreading member, said spreading member disposed below said outlet opening whereby said granular material passing through said outlet opening from said hopper flows to said spreading member, said spreading member comprising rotating means, a shaft and blades, said rotating means rotating said spreading member relative to said hopper in a substantially horizontal plane, said shaft containing the axis of said rotation of said spreading member, said shaft comprising a lower part and an upper part, said lower part below said hopper, said upper part inside said hopper, said blades extending radially outwardly from said lower part of said shaft, said upper part of said shaft comprising an eccentric shaft, said eccentric shaft eccentrically connected to said upper part of said shaft, said eccentric shaft comprising stirring means whereby granular material in said hopper is stirred by said stirring means when said shaft rotates.

52. An implement as claimed in claim 51 further comprising a frame supporting said hopper and said spreading member, said frame comprising coupling means for connection to a tractor, said coupling means comprising tilting means for tilting said frame.

53. An implement as claimed in claim 52 wherein said frame further comprising a vertical post and wherein said tilting means comprises a tilting plate pivotally connected to said frame, said tilting plate comprises a first and a second pin and a first, a second and a third hole, said first hole's center and said second hole's center defining two points in a first line, said second hole's center and said third hole's center defining two points in a second line, said first line and said second line intersecting at said second hole's center to define an oblique angle therebetween, said second pin received by said second hole, said first pin selectively received by said first or said third hole, said first pin when in said first hole abutting against said vertical post supporting said frame in a horizontal position in respect to said tractor, said first pin when in said third hole abutting against said vertical post supporting said frame in another horizontal position is respect to said tractor.

54. A implement as claimed in claim 52 wherein said tilting means comprises an actuating piston/cylinder combination and a tilting plate, said tilting plate comprising a forward end and an aft end, said forward end pivotally connected to said tractor, said aft end pivotally connected to said frame, said actuating piston/cylinder combination comprising two ends, a bottom end and a top end, said bottom end being pivotally connected to said tilting plate, said top end being pivotally connected to said frame.

55. An implement as claimed in claim 50 wherein said adjusting means further comprises locking means wherein said locking means secures said adjusting means whereby said metering slide is substantially rigidly held in said position.

* * * * *